United States Patent
Walter et al.

(10) Patent No.: US 10,894,366 B2
(45) Date of Patent: Jan. 19, 2021

(54) METHOD FOR WELDING POLYAMIDE AND POLY(METH)ACRYLATE PLASTICS

(71) Applicant: Henkel AG & Co. KGaA, Duesseldorf (DE)

(72) Inventors: Pablo Walter, Munich (DE); Norman Friedrich, Munich (DE); Lina Gonzalez, Munich (DE); Hendrik Luetzen, Munich (DE); Thomas Haertig, Munich (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 217 days.

(21) Appl. No.: 15/933,906

(22) Filed: Mar. 23, 2018

(65) Prior Publication Data

US 2018/0208726 A1    Jul. 26, 2018

Related U.S. Application Data

(63) Continuation of application No. PCT/EP2016/074655, filed on Oct. 14, 2016.

(30) Foreign Application Priority Data

Oct. 16, 2015    (EP) .................................... 15190208

(51) Int. Cl.
| | | |
|---|---|---|
| B29C 65/02 | (2006.01) | |
| B29K 33/00 | (2006.01) | |
| B29K 77/00 | (2006.01) | |
| C09D 133/12 | (2006.01) | |
| B29C 65/00 | (2006.01) | |
| B29C 65/06 | (2006.01) | |
| B29C 65/14 | (2006.01) | |
| B29C 65/16 | (2006.01) | |
| B29C 65/38 | (2006.01) | |
| B29C 65/18 | (2006.01) | |
| B29C 65/08 | (2006.01) | |
| B29C 65/04 | (2006.01) | |
| B29C 65/20 | (2006.01) | |
| B29C 65/50 | (2006.01) | |

(Continued)

(52) U.S. Cl.
CPC .............. *B29C 65/02* (2013.01); *B29C 66/02* (2013.01); *B29C 66/026* (2013.01); *B29C 66/71* (2013.01); *B29C 66/712* (2013.01); *C09D 133/12* (2013.01); *B29C 65/04* (2013.01); *B29C 65/06* (2013.01); *B29C 65/0618* (2013.01); *B29C 65/0627* (2013.01); *B29C 65/0636* (2013.01); *B29C 65/0672* (2013.01); *B29C 65/08* (2013.01); *B29C 65/10* (2013.01); *B29C 65/1412* (2013.01); *B29C 65/1425* (2013.01); *B29C 65/16* (2013.01); *B29C 65/1635* (2013.01); *B29C 65/1658* (2013.01); *B29C 65/1661* (2013.01); *B29C 65/1667* (2013.01); *B29C 65/1696* (2013.01); *B29C 65/18* (2013.01); *B29C 65/20* (2013.01); *B29C 65/38* (2013.01); *B29C 65/5057* (2013.01); *B29C 65/72* (2013.01); *B29C 66/731* (2013.01); *B29K 2033/08* (2013.01)

(58) Field of Classification Search
CPC ... C08J 5/122; C08J 5/12; C08J 7/0427; C08J 5/121; C08J 2333/12; C08J 2377/00; C08J 2425/08; C08L 33/08; C08L 33/12; C08L 77/00; B29C 65/02; B29C 66/71; B29C 66/712; B29C 66/02; B29C 66/026; B29C 65/0672; B29C 65/1425; B29C 65/16; B29C 65/38; B29C 65/1412; B29C 65/1667; B29C 65/1696; B29C 65/0618; B29C 65/06; B29C 65/1658; B29C 65/18; B29C 65/0627; B29C 65/1635; B29C 65/08; B29C 65/04; B29C 65/20; B29C 65/5057; B29C 66/731; B29C 65/72; B29C 65/10; B29C 65/0636; B29C 65/1661; B29K 2033/08; B29K 2033/12; B29K 2077/00; C09D 133/12; C09D 5/002; C09D 125/08

See application file for complete search history.

(56) References Cited

U.S. PATENT DOCUMENTS

| | | |
|---|---|---|
| 3,607,570 A | 9/1971 | Hildebrandt et al. |
| 3,650,809 A | 3/1972 | Gilliam et al. |
| 4,247,427 A | 1/1981 | Edinger |

(Continued)

FOREIGN PATENT DOCUMENTS

| | | |
|---|---|---|
| CN | 1040812 A | 3/1990 |
| CN | 1555397 A | 12/2004 |

(Continued)

OTHER PUBLICATIONS

International Search Report issued in connection with International Patent Application No. PCT/EP2016/074655 dated Dec. 5, 2016.

(Continued)

Primary Examiner — John D Freeman
(74) Attorney, Agent, or Firm — James E. Piotrowski

(57) ABSTRACT

The invention relates to a method for welding a polyamide plastic and a poly(meth)acrylate—particularly a polymethyl methacrylate—plastic using a primer, said primer containing at least one copolymer synthesised from at least one styrene or styrene derivative and at least one maleic anhydride or maleic anhydride derivative. The invention also relates to correspondingly welded products.

18 Claims, No Drawings

(51) Int. Cl.
   *B29C 65/72* (2006.01)
   *B29C 65/10* (2006.01)

(56) References Cited

U.S. PATENT DOCUMENTS

| | | | |
|---|---|---|---|
| 4,880,487 | A | 11/1989 | Sheehan et al. |
| 5,378,758 | A | 1/1995 | Amici et al. |
| 5,760,379 | A | 6/1998 | Matsen et al. |
| 6,199,279 | B1 | 3/2001 | Humphrey et al. |
| 6,734,256 | B1 | 5/2004 | Everaerts et al. |
| 7,276,557 | B2 | 10/2007 | Macedo et al. |
| 8,474,401 | B2 | 7/2013 | Leiden et al. |
| 8,741,081 | B2 | 6/2014 | Schmitt et al. |
| 10,596,766 | B2 | 3/2020 | Walter et al. |
| 10,777,100 | B2 | 9/2020 | Kyogane et al. |
| 2001/0034386 | A1* | 10/2001 | Scheibelhoffer ........... C09J 5/00 524/98 |
| 2003/0041956 | A1 | 3/2003 | Pigott et al. |
| 2003/0130381 | A1 | 7/2003 | Joachimi et al. |
| 2005/0048290 | A1 | 3/2005 | Koshida |
| 2005/0261422 | A1 | 11/2005 | Ton-That et al. |
| 2006/0142451 | A1 | 6/2006 | Yushina et al. |
| 2006/0269701 | A1* | 11/2006 | Gauriat ................. C09J 177/02 428/31 |
| 2007/0084550 | A1 | 4/2007 | Epstein et al. |
| 2007/0134504 | A1 | 6/2007 | Katayama et al. |
| 2007/0212532 | A1 | 9/2007 | Krumbacher et al. |
| 2008/0217821 | A1 | 9/2008 | Goring et al. |
| 2010/0003534 | A1* | 1/2010 | Luetzeler ................. B32B 7/12 428/480 |
| 2010/0065200 | A1 | 3/2010 | Sarver et al. |
| 2010/0221063 | A1 | 9/2010 | Hardison, III et al. |
| 2011/0056966 | A1 | 3/2011 | Feichtinger et al. |
| 2011/0165772 | A1 | 7/2011 | Quillen et al. |
| 2013/0160937 | A1 | 6/2013 | Park et al. |
| 2015/0073093 | A1 | 3/2015 | Isobe |
| 2015/0080511 | A1 | 3/2015 | Knutson et al. |
| 2016/0207252 | A1 | 7/2016 | Walter et al. |
| 2018/0207879 | A1 | 7/2018 | Walter et al. |
| 2019/0240919 | A1 | 8/2019 | Luetzen et al. |

FOREIGN PATENT DOCUMENTS

| | | |
|---|---|---|
| CN | 1955219 A | 5/2007 |
| CN | 101057035 A | 10/2007 |
| DE | 3823817 C1 | 11/1989 |
| DE | 4242059 C1 | 3/1994 |
| DE | 102006054936 A1 | 5/2008 |
| DE | 102010009562 A1 | 10/2010 |
| DE | 102012004385 A1 | 9/2013 |
| EP | 0876436 B1 | 4/2002 |
| EP | 1642701 A1 | 4/2006 |
| GB | 2082502 A | 3/1982 |
| GB | 2093763 A | 9/1982 |
| GB | 2 419 844 A | 5/2006 |
| JP | S6021249 A | 2/1985 |
| JP | 2002018961 A | 1/2002 |
| JP | 3541064 B2 | 7/2004 |
| JP | 2006026974 A | 2/2006 |
| JP | 2011240496 A | 12/2011 |
| JP | 2011240497 A | 12/2011 |
| JP | 2013014113 A | 1/2013 |
| JP | 2015037966 A | 2/2015 |
| JP | 2015523240 A | 8/2015 |
| WO | 03011573 A1 | 2/2003 |
| WO | 2007109855 A1 | 10/2007 |
| WO | 2008113821 A1 | 9/2008 |
| WO | 2014034881 A1 | 3/2014 |

OTHER PUBLICATIONS

Lu C et al.: Weld line morphology and strength of polystyrene/polyamid-6-poly(styrene-co-maleic anhydride) blends, European Polymer Journal, Pergamon Press Ltd., Oxford, GB, vol. 40, No. 11, pp. 2565-2572 (2004).
International Search Report issued in connection with International Patent Application No. PCT/EP2016/074657 dated Dec. 6, 2016.
Juhl Thomas Brokholm et al.: Predicting the laser weldability of dissimilar polymers, Polymer Elsevier Science Publishers B.V. GB, vol. 54, No. 15, May 31, 2013, pp. 3891-3897.
Helfand, E. 1975, J. Chem. Phys. 62, 999-1005.
Polymer Blends Handbook ISBN 1402011148, 9781402011146.
International Search Report issued in connection with International Patent Application No. PCT/EP2016/074661 dated Dec. 5, 2016.
Database Caplus (Online) Chemical Abstracts Service, Columbus, Ohio, US; 1985, Ube Industries, Ltd. Japan: Manufacture of composite film.
International Search Report for International PCT Patent Application No. PCT/EP2017/077306 dated Jan. 9, 2018.
Huixia Liu et al.: "Study on Welding Mechanism based on Modification of Polypropylene for Improving the Laser Transmission Weldability to PA66," Materials, vol. 8, No. 8, Aug. 4, 2015, pp. 4961-4977.
DIN 1910-3:1977-09.
International Search Report issued in connection with International Patent Application No. PCT/EP2016/074659 dated Dec. 5, 2016.
Kraton G1652 M Polymer, Aug. 10, 2009, XP055265187, North America, http://docs.kraton.com/pdfDocuments/20090810103615281 62819.PDF.
A part of Textbook A (Plastic Alloy, Japan Polymer Association, pp. 234-238).
A part of Textbook B (Development of Chemical Industry in the World, Dong Hengqian, pp. 190-191, Chemical Industry Press, published in Jul. 1986).
A part of Textbook C: Practical Technology of Plastic Modification, Wang Wenguang, pp. 48-50, China Light Industry Press, published in Mar. 2000.
D4: Experimental Study of Laser Transmission Welding between Polycarbonate and Polypropylene Oxide, WuYanwei et al.; "Chinese Journal of Lasers," vol. 42, No. 5, pp. 147-153, May 10, 2015.
D5: Investigation of polymer blends of polyamide-6 and poly(methyl methacrylate) synthesized by RAFT polymerization, Abbas A. Khaydarov et al.; "Polymer Bulletin," vol. 66, No. 8, pp. 1089-1098, Oct. 24, 2010.
D6: Strategies for compatibilization of polymer blends, COR KONING, et al. "Progress in Polymer Science," vol. 23, No. 4, pp. 707-757, 1998.
Study on compatibility of recycled polypropylene/high-density polyethylene blends using rheology, Adam Al-Mulla, et al.: "Polymer Bulletin," vol. 71, No. 9, pp. 2335-2352, Jun. 27, 2014.
International Search Report for International PCT Patent Application No. PCT/EP2016/074678 dated Dec. 22, 2016.
Volkov S S: "Main methods and technological features of welding dissimilar plastics", Welding International, Taylor & Francis, Abingdon, GB, Bd. 22, Nr. 3, Mar. 1, 2008 (Mar. 1, 2008), pp. 193-197, CP001550012, ISSN: 0950-7116; D01: 10.1080/09507110802065561.
Common knowledge evidence 1, Xu Zifen et al., Handbook of China packaging engineering, Feb. 1996, pp. 161.
Common knowledge evidence 2, MA Jianwei et al., Introduction to Non-woven fabrics techniques, Apr. 2004, pp. 26.
Hyung Gon Lee et al., Macromolecular Research, vol. 17, No. 6, pp. 417-423, Jun. 2009.
Hansen, "Hansen Solubility Parameters A User's Handbook," 2nd ed., Ch. 5, Methods of Characterization—Polymers, pp. 95-111 (2007).
Garagheizi et al., "New Procedure to Calculate the Hansen Solubility Parameters of Polymers," J. App. Poly. Sci., vol. 35 U.S.C. Section 103, pp. 31-36 (2007).
Monument Chemical, Technical Product Information for Tetrahydrofuran, 2018 (https://monumentchemical.com/uploads.files/TDS/THF%20-%20TDS.pdf) (Year: 2018).
Millipore Sigma, Cyclohexanone Product Information (https://www.emdmillipore.com/US/en/product/Cyclohexanone, END_CHEM-CX2335) (Year: 2016).

(56) References Cited

OTHER PUBLICATIONS

Kraton D1101 K Polymer Data Document, KRATON Polymers, https://cdn.thomasnet.com/ccp/01308444/107551.pdf (Nov. 6, 2009).
Raja et al., "Pure Monomer Resins for Thermoplastic Elastomer Compounding Applications," Rubber World (Oct. 2013).
Hansen, HSP Examples, Double Sphere, Hansen Solubility Parameters, Internet Archive capture dated May 2016.
MatWeb, Material Property Data for Vestoplast 828, internet archive capture dated Sep. 28, 2015.
Sigma Aldrich, Toluene, Solvent Center, downloaded from internet on Aug. 28, 2019 (https://www.sigmaaldrich.com/chemistry/solvents/toluene-center.printerview.html) (Year: 2019).
C.A. Lukey, "Thermoset Coatings," Editor(s): K.H. Juergen Buschow, Robert W. Cahn, Merton C. Flemings, Bernhard Ilshner, Edward J. Kramer, Subhash Mahajan, Patrick Veyssiere, Encyclopedia of Materials: Science and Technology, Elsevier, 2001, pp. 9209-9215 (Year:2001).
Schmidt et al., Polyesters—Ulmann's Encyclopedia of Industrial Chemistry, 2000, vol. 28, pp. 623-646 (Year: 2000).
Nguyen et al., "Molecular Weight Distribution and Mechanical Properties," Mechanical Properties and Testing of Polymers, Springer, 1999, pp. 143-155 (Year: 1999).
Polyethylene (PE) (2020). In Encyclopedia Britannica. Retrieved from https://academic.eb.com/levels/collegiate/article/polyethylene/98896.

\* cited by examiner

METHOD FOR WELDING POLYAMIDE AND POLY(METH)ACRYLATE PLASTICS

The present invention relates to a method for welding a polyamide plastics and a poly(meth)acrylate plastics using a primer, the primer containing at least one copolymer synthesized from at least one styrene or styrene derivative and at least one maleic anhydride or maleic anhydride derivative. The present invention also relates to correspondingly welded products.

Various methods are known from the prior art for interconnecting two or more substrates that consist of plastics materials, such as polyolefins, polyacrylates or polyamide. In this case, there are both mechanical connection options, such as locking or screwing, or adhesive bonding methods. Alternatively, plastics materials can also be welded together. Welding is a joining method for non-detachably, integrally, physically connecting plastics materials that are generally of the same type, such as PE and PE, or PA and PA. Thermoplastics of the same type are polymers that do not differ substantially in terms of their molecular structure, their melting point, their melting viscosity and their coefficient of thermal expansion, and can in principle be mixed with one another to an extent. Plastics materials of the same type are usually plastics materials having an identical polymer base and/or an identical plastics.

A wide range of methods are known for welding together two or more plastics materials of the same type. In this case, a wide range of welding methods can be used, such as infrared welding, infrared/friction welding or ultrasonic welding. These methods for welding plastics materials of the same type are based on the relevant plastics materials being melted in the region of the welding zone and the materials being interconnected in said zone in an integrally bonded and frictional manner.

These welding methods work well provided that plastics materials of the same type are to be interconnected. However, as soon as two plastics materials that are not of the same type and/or that are mutually incompatible, such as polyamide and poly(meth)acrylate plastics, are to be welded together, it is not possible to produce a lasting connection between the two substrates that has a sufficiently high mechanical strength. If an attempt is made to directly weld the two plastics, polyamide and poly(meth)acrylate, or, more precisely, poly(methylmethacrylate), using the welding method known from the prior art, no or only very low strengths are achieved.

Up to now, it has been possible to interconnect corresponding different plastics materials only by means of a mechanical connection or an adhesive bonding method. The disadvantage of a mechanical connection is the complicated attachment, the punctual material stress, and the need to use an additional mechanical connection means. Furthermore, integrally bonded connections can rarely be achieved in the case of a mechanical connection. The disadvantage of an adhesive bonding method, however, is that the final strength of the connection is achieved only after a long period of time which may be of up to several weeks. Furthermore, adhesively bonding low-energy surfaces usually requires laborious pretreatment of the join partners. In addition, an adhesive connection is often not indefinitely stable on account of outside weather conditions. Moreover, providing a clean adhesive connection is often complicated and time-consuming. Connection by means of a welding method is thus the cleanest, quickest and simplest solution for plastics materials.

The object of the present invention is therefore that of providing a simple method for welding a polyamide plastics and a poly(meth)acrylate, in particular poly(methylmethacrylate), plastics. In this case, the connection between said different plastics materials by means of the weld seam is intended to be as stable as possible and long-lasting.

It has surprisingly been found that this object is achieved by a method for welding a polyamide plastics and a poly(meth)acrylate, in particular poly(methylmethacrylate), plastics using a primer, the primer containing at least one copolymer synthesized from at least one styrene or styrene derivative and at least one maleic anhydride or maleic anhydride derivative.

Using a primer containing at least one corresponding copolymer has made it possible to achieve particularly stable and non-ageing connections between the plastics materials when welding a polyamide plastics and a poly(methylmethacrylate) plastics.

The first join partner to be welded using a primer is a polyamide plastics. The polyamide plastics is preferably a thermoplastic polyamide. The amide-based thermoplastic polymers included, for example, polyamide 6, a homopolymer of epsilon-caprolactam (polycaprolactam); polyamide 11, a polycondensate of 11-Aminoundecanoic acid poly(11-aminoundecanamide); polyamide 12, a homopolymer of omega-lauryl lactam (polylauryl lactam); polyamide 6.6, a hornopolycondensation of hexamethylenediamine and adipic acid (polyhexamethylene adipamide); polyamide 6.10, a homopolycondensation of hexamethylenediamine and sebacic acid (poly(hexamethylene sebacamide)); polyamide 6.12, a homopolycondensation of hexamethylenediamine and dodecanedioic acid (polyhexamethylene dodecanamide), or polyamide 6-3-T, a homopolycondensation of trimethylhexamethylenediamine and terephthalic acid (polytrimethylhexamethylenediamine), poly(p-phenylene terephthalamide) or poly(m-phenylene terephthalamide) of phenylenediamine and terephthalic acid, polyphthalamides (PPA) of different diamines and terephthalic acid, and mixtures thereof.

Optically transparent polyamides include monocrystalline polyamides containing linear aliphatic dicarboxylic acids and cyclo-aliphatic diamines, amorphous polyamides containing linear aliphatic dicarboxylic acids and cyclo-aliphatic diamines and optionally lactams or amino acids, amorphous polyamides containing terephthalic acid and cyclo-aliphatic or branched aliphatic diamines and optionally lactams or amino acids, or amorphous polyamides containing isophthalic acid and cyclo-aliphatic or linear or branched aliphatic diamines and optionally lactams or amino acids. Suitable optically transparent polyamides are, for example, amides of dodecanedioic acid and a mixture of isomers of 4,4'-diaminodicyclohexylmethane, of terephthalic acid and the mixture of isomers of 2,2,4- and 2,4,4-trimethylhexamethylenediamine, of dodecanedioic acid and the mixture of isomers of 3,3'-dimethyl-4,4'-di(aminocyclohexyl)-methane, of lauryl lactam, isophthalic acid and the mixture of isomers of 3,3'-dimethyl-4,4'-di(aminocyclohexyl)-methane or of tetradecanedioic acid and the mixture of isomers of 3,3'-dimethyl-4,4'-di(aminocyclohexyl)-methane or of epsilon-caprolactam or omega-lauryl lactam.

Preferred polyamides are selected from the group consisting of polyamide 6, polyamide 6.6, polyamide 6.10, polyamide 6.12, polyamide 10.10, polyamide 11, polyamide 12, polyamide 10.12, polyphthalamides, optical transparent polyamides or mixtures based on said polyamides. Particularly preferred polyamides are selected from polyamide 6, polyamide 6.6, polyamide 12, polyphthalamides, optically transparent polyamides and the mixtures thereof, in particular polyamide 12, polyamide 6, polyamide 6.6 and the mixtures thereof. The polyamide plastics can also contain further components, e.g. fillers such as glass fibers, pigments, mineral particles, dyes, rheology auxiliary agents, release aids or stabilizers. The polyamide plastics preferably consists to more than 40 wt. %, in particular more than 60 wt. %, preferably more than 70 wt. %, preferably more than 90 wt. % of the mentioned polyamides, based in each case on the total polyamide plastics (including fillers). The polyamide plastics preferably consists to more than 90 wt. %, in particular more than 95 wt. %, preferably more than 98 wt. % of the mentioned polyamides, based in each case on the total polymer content of the polyamide plastics (total polyamide plastics without fillers). The polyamide plastics preferably have a content of the mentioned polyamide of 50-90 wt. %, in particular 60-80 wt. %, based in each case on the total polyamide plastics (including fillers).

Poly(meth)acrylate is a synthetic, preferably transparent, thermoplastic. Preferred poly(meth)acrylates are made up of 50 to 100 wt. %, in particular 70 to 100 wt. % acrylate and/or methacrylate, the (meth)acrylate units preferably being esterified with a C1 to C12 alkyl functional group, in particular C1-C4, preferably methyl functional group. The written form poly(meth)acrylate indicates that the polymer is made up of acrylate and/or methacrylate. That is to say that the written form (meth)acrylate indicates that it may be both an acrylate and a methacrylate. It is preferable in particular for the poly(meth)acrylate to be a poly(methylmethacrylate) (PMMA, colloquially also known as acrylic glass or Plexiglas). Preferred poly(methylmethacrylate)s are made up of 50 to 100 wt. %, in particular 70 to 100 wt. % methyl methacrylate.

Primarily, (meth)acrylic acid, in particular acrylic acid, and the alkyl esters thereof having 1 to 12 carbon atoms, in particular 1 to 4 carbon atoms in the alkyl functional group, and acrylo and/or methacrylonitrile, acryl and/or methacrylamide, styrene and/or maleic anhydride are possible as comonomers for making up the poly(meth)acrylate, in particular the poly(methylmethacrylate). Thermoplastically and thermoelastically deformable plastics materials are preferred. Preferred thermoplastic poly(methylmethacrylate) plastics have weight-average molar masses (weight average Mw) of more than 50000 g/mol, in particular more than 100000 g/mol. The thermoplastic poly(meth)acrylate, in particular poly(methylmethacrylate), plastics preferably have a weight-average molar mass (weight average Mw) of less than 2000000 g/mol, in particular less than 1000000 g/mol, preferably less than 500000 g/mol. Particularly preferred thermoplastic poly(meth)acrylate, in particular poly (methylmethacrylate), plastics have weight-average molar masses (weight average Mw) of from 50000 g/mol to 250000 g/mol, e.g. approximately 100000 g/mol to approximately 180000 g/mol for the injection molding.

The poly(meth)acrylate, in particular the poly(methylmethacrylate), plastics can also contain further components, e.g. fillers such as glass fibers, pigments, dyes, rheology auxiliary agents, release aids or stabilizers. The poly(meth) acrylate, in particular the poly(methylmethacrylate), plastics preferably consists to more than 90 wt. %, in particular more than 95 wt. %, preferably more than 98 wt. % of the mentioned poly(meth)acrylates, in particular the mentioned poly(methylmethacrylate)s, based in each case on the polymer content of the poly(meth)acrylate plastics (total poly (meth)acrylate plastics without fillers). The poly(methylmethacrylate) plastics preferably consists to more than 90 wt. %, in particular more than 95 wt. %, preferably more than 98 wt. % of the mentioned poly(meth)acrylates, in particular the mentioned poly(methylmethacrylate)s, based in each case on the total poly(meth)acrylate plastics (including fillers).

A further essential part of the invention is the use of at least one primer, preferably precisely one primer. The primer contains at least one copolymer which contains at least one styrene or styrene derivative and at least one maleic anhydride or maleic anhydride derivative as a monomer incorporated by polymerization.

The primer is a welding auxiliary agent that is preferably applied, as a pretreatment layer, to at least one of the substrate surfaces to be welded, in the region of the joining zone. The primer is not to be understood as an adhesive, cleaning agent or similar, but instead the primer is an auxiliary agent for welding, as a result of which the join partners are made mutually compatible in the joining zone (or welding zone), and thus an integrally bonded and frictional connection is achieved in the joining zone, upon joining, between the substrates to be welded.

The tests have shown that using a corresponding primer that contains a copolymer according to the invention makes it possible for the plastics, polyamide and poly(meth)acrylate, to be made compatible in the join seam upon welding, and for a stable and lasting connection to thus be achieved. If a corresponding primer is not used, no or only very low strengths of the welded connection can be achieved. Preferably, the joined substrates have a tensile strength of more than 2 MPa, in particular more than 4 MPa. Tensile strength is determined at a traction speed of 5 mm/s and in accordance with the test execution described in the tests.

The at least one first copolymer in the primer is preferably synthesized at least from the monomers styrene and maleic anhydride. In addition to the styrene or styrene derivative, such as alpha-methylstyrene, and the maleic anhydride or maleic anhydride derivative, the copolymer can also contain further monomers incorporated by polymerization. The copolymer preferably contains monomers selected from the group of acrylates and methacrylates (together (meth)acrylates), in particular (meth)acrylates comprising an alkyl functional group having from 1 to 12 carbon atoms, preferably 1 to 4 carbon atoms, preferably methyl(meth)acrylate. Furthermore, functional monomers having functionalities such as epoxide or isocyanate groups, carboxyl or amine groups, but also alkoxysilane groups can also be used.

In a particular embodiment, the copolymer consists of styrene and maleic anhydride incorporated by polymerization. In another particular embodiment, the copolymer consists of styrene, maleic anhydride and methyl methacrylate incorporated by polymerization. The monomers can be used in different molar ratios in these variants.

In a preferred embodiment of the copolymer according to the invention, the molar ratio of styrene to maleic anhydride is from 1:0.01 to 1:2, preferably 1:0.05 to 1:1, particularly preferably 1:0.1 to 1:0.3. In a further preferred embodiment of the copolymer according to the invention comprising acrylate and/or methacrylates incorporated by polymerization, in particular methyl acrylate and/or methyl methacrylate, the molar ratio of styrene to (meth)acrylate to maleic anhydride is from 1:5:2 to 1:0.2:0.01, in particular 1:2:1 to 1:0.5:0.05, preferably 1:1.5:0.5 to 1:0.8:0.1, particularly preferably 1:1:0.2.

The copolymers can be synthesized from the monomers in a known manner. In addition, the copolymers can be grafted in a polymer-like reaction. Particularly preferred reactants for grafting are alcohols, thiols, amines, isocyanates, anhydrides, carboxylic acids, in particular alcohols, preferably alcohols having from 1 to 6 carbon atoms, such as methanol and isobutanol. For the purpose of grafting, the maleic anhydride monomers or maleic anhydride units in the polymer react with the reactant, in particular are esterified by alcohols. The maleic anhydride groups preferably react or esterify only partially, in particular less than 70% of the maleic anhydride groups. It is preferable for the maleic anhydride groups not to be reacted and to continue to be present as anhydride groups. In the preferred embodiment, the maleic anhydride groups can also be present hydrolyzed in part. Complete reaction of the maleic anhydride groups can lead to a reduction in the strength of the resulting welded connection.

Copolymers that have a maleic anhydride content of more than or equal to 0.1 wt. %, in particular more than or equal to 0.5 wt. %, preferably more than or equal to 4 wt. %, particularly preferably more than or equal to 8 wt. %, based on the copolymer, are particularly advantageous. The copolymers advantageously have a maleic anhydride content of 0.1-50 wt. %, in particular 0.5-40 wt %, preferably 4-30 wt. %, particularly preferably 8-26 wt. %, based on the copolymer. Copolymers having a corresponding maleic anhydride content exhibit particularly good strengths of the welded connection.

Furthermore, copolymers are preferred that have a glass transition temperature Tg (determined by means of DSC at a heating rate of 10 K/min in nitrogen, in particular following DIN EN ISO 11357-1:2010-3 and DIN EN ISO 11357-2:2014-07) of more than 30° C., in particular more than 80° C., particularly preferably more than 100° C. Copolymers having a corresponding glass transition temperature in particular improve the mechanical properties of the welded connection at high temperatures.

The copolymers advantageously have a weight-average molecular weight Mw of more than or equal to 5000 g/mol, in particular more than or equal to 50000 g/mol, preferably more than or equal to 100000 g/mol. The copolymers preferably have a weight-average molecular weight Mw in the range of from 5000-2000000 g/mol, in particular from 50000-1000000 g/mol, preferably from 100000-500000 g/mol. Copolymers having a corresponding weight-average molecular weight have a positive effect on the brittleness and strength of the obtained connection. The weight-average molecular weight can be determined by GPC against a polystyrene standard.

In addition to the copolymer, the primer can preferably contain at least one further polymer. The at least one further polymer or copolymer is preferably compatible with at least one of the two plastics materials to be welded and with the primer copolymer. The primer particularly preferably contains at least one polyamide polymer and/or a poly(meth)acrylate, in particular poly(methylmethacrylate), polymer, preferably in each case one of those specified above. Most preferably, the primer contains at least one poly(methylmethacrylate) polymer. Using an additional polymer in the primer as well as the copolymer according to the invention has led to a further improvement in the strength.

The polymer used as the compatible further polymer is preferably one having a weighted quadratic distance of the Hansen parameter $(R_a)^2$, in particular from the two plastics materials to be joined and in particular also from the first polymer according to the invention mentioned above, of less than 22 MPa, in particular of less than 17 MPa, preferably of less than 15 MPa, particularly preferably of less than 12 MPa.

The weighted quadratic distance of the Hansen parameter $(R_a)^2$ is determined according to the following formula:

$$(R_a)^2 = 4(\Delta\delta_D)^2 + (\Delta\delta_P)^2 + (\Delta\delta_H)^2$$

In this formula, $\delta_D$ is the Hansen parameter for the dispersion forces, Op is the Hansen parameter for the polarity, and OH is the Hansen parameter for the hydrogen bridge bonds. $\Delta\delta_D$, $\Delta\delta_P$ and $\Delta\delta_H$ in each case denote the differences of these Hansen parameters for the plastics materials or polymers to be compared, e.g. $\Delta\delta_D = (\delta_{D1} - \delta_{D2})$ of polymers 1 and 2. The values of the individual Hansen parameters $\delta_D$, $\delta_P$ and $\delta_H$ for the relevant plastics materials or polymers are determined according to the book "Hansen Solubility Parameters: A User's Handbook" by Charles M. Hansen (second edition; Taylor & Francis Group; 2007; ISBN-10 0-8493-7248-8). A number of values for individual polymers can already be found in this source. According to the method described in this book, the Hansen parameters can preferably be obtained from the accompanying database using the program HSPIP (4th edition 4.1.07), or, if this is not available, can be determined using the incorporated "DIY" functionality of the program, preferably using the accompanying neural network, as described in the "help" section. The HSPIP program is available from the company Steven Abbott TCNF Ltd.

The at least one poly(meth)acrylate, in particular poly(methylmethacrylate), polymer in the primer preferably has weight-average molar masses (weight average Mw) of more than 50000 g/mol, in particular more than 100000 g/mol. The poly(meth)acrylate, in particular poly(methylmethacrylate), polymers in the primer preferably have a weight-average molar mass (weight average Mw) of less than 2000000 g/mol, in particular less than 1000000 g/mol, preferably less than 500000 g/mol. Particularly preferred poly(meth)acrylate, in particular poly(methylmethacrylate), polymers in the primer have weight-average molar masses (weight average Mw) of from 50000 g/mol to 250000 g/mol.

The content of the further polymer, in particular the poly(methylmethacrylate) polymer, on the primer is preferably 1-40 wt. %, in particular 5-30 wt. %, particularly preferably 10-20 wt. %, based in each case on the total weight of the primer. The content of the further polymer, in particular the poly(methylmethacrylate) polymer, on the polymer content of the primer is preferably 5-70 wt. %, in particular 20-60 wt. %, particularly preferably 30-50 wt. %, based in each case on the total polymer content of the primer (primer without solvents and without fillers).

In addition to the copolymer and the further polymer, the primer can also contain a solvent, in particular an organic solvent. The primer preferably has a solvent content of 10-90 wt. %, in particular 50-85 wt. %, particularly preferably 60-80 wt. %, based in each case on the total weight of the primer.

All conventional solvents, such as water, alcohols, ketones such as methyl isobutyl ketone (MIBK) or cyclohexanone (CH), ethers such as diethyl ether or tetrahydrofuran (THF), esters such as ethyl acetate, or carbonates such as dimethyl or dipropyl carbonate or mixtures thereof are suitable solvents.

In a preferred embodiment, the primer contains organic solvents. Particularly preferred solvents are solvents having a vapor pressure at 20° C. of from 1 to 600 hPa, in particular 2 to 200 hPa, particularly preferably 5 to 20 hPa. In this case, solvents having a corresponding vapor pressure have been found to be particularly advantageous for minimizing or preventing bubble formation in the primer layer upon evaporation. Particularly preferably the primer contains a solvent selected from tetrahydrofuran, methyl isobutyl ketone, cyclohexanone and mixtures thereof, particularly preferably the primer contains tetrahydrofuran or a mixture of methyl isobutyl ketone and cyclohexanone. If a mixture of methyl isobutyl ketone and cyclohexanone is used as the solvent, said mixture preferably contains 10-50 wt. %, in particular 20-35 wt. % cyclohexanone, based in each case on the total solvent mixture.

If organic solvents are used, the total polymer content of the primer is preferably 10-90 wt. %, in particular 15-50 wt. %, particularly preferably 20-40 wt. %, based in each case on the total weight of the primer. The total polymer content corresponds to the content of all the polymers used in the primer, in particular the copolymers according to the invention and the further polymers described above.

In another preferred embodiment the primer is present in the form of an aqueous dispersion or emulsion. In this case, the copolymer according to the invention and, if present, the further polymers, are emulsified or dispersed in water. In this case, the total polymer content of the primer is preferably 5-90 wt. %, in particular 10-70 wt. %, particularly preferably 20-55 wt. %, based in each case on the total weight of the primer. For the aqueous dispersion/emulsion, it is advantageous for the polymer component to consist substantially of only the copolymer according to the invention and the optionally present further polymer mentioned above, in particular only the copolymer according to the invention. The term "substantially of" is understood, according to the invention, to mean that the copolymer component consists to more than 95 wt. %, preferably more than 97 wt. %, most particularly preferably more than 99 wt. % of the copolymer according to the invention and the optionally present further polymer mentioned above, in particular consists only of the copolymer according to the invention.

In addition to the copolymer according to the invention, the further polymer mentioned above, and a solvent, the primer may contain further components such as fillers, (fluorescent) dyes and pigments, rheological auxiliary agents, defoaming agents, wetting agents, stabilizers or plasticizers. However, apart from dye and pigments, the primer is preferably substantially free of further components, in particular substantially free of any other components. The term "substantially free of" is understood, according to the invention, to mean that the primer contains less than 5 wt. %, preferably less than 1 wt. %, most particularly preferably less than 0.1 wt. % of the relevant substances, in particular does not contain the relevant substances.

In the method according to the invention for welding a polyamide plastics and a poly(meth)acrylate plastics, a primer is used, the primer containing at least one copolymer synthesized from at least one styrene or styrene derivative and at least one maleic anhydride or maleic anhydride derivative.

In this method, the primer functions as an auxiliary agent for welding the two plastics, polyamide and poly(meth)acrylate, by fusion in each case. The primers used containing a copolymer according to the invention make it possible to produce compatibility between the two join partners, as a result of which a stable and lasting integrally bonded connection between the two plastics materials can be produced.

The primer can be applied to the surface of one or both join partners using a wide range of methods. Thus, for example, said primer can be applied using a metering device, using a needle and metering robot, by means of injection molding, by means of extrusion, by means of film coating, by means of application as a hot melt, by means of spraying, by means of spreading, or by means of dipping.

When applying the primer, said primer can be applied either to just one surface or to both surfaces of the substrates to be welded. The primer is preferably applied to just one surface, in particular the polyamide surface. In the case of welding using a film, the film is laid between the substrates.

In the case of the primer containing a solvent, after being applied to one or both surfaces, the primer is preferably dried until the solvent has evaporated to such an extent that a non-sticky, dimensionally stable primer layer is achieved. In particular, the primer is weldable after just a few seconds and for a period of up to several weeks. After being applied, the primer is preferably dried for at least one hour, preferably for at least 12 hours.

The application to one or both surfaces of the substrates to be welded is preferably carried out such that the primer has a layer thickness of from 1 µm to 5000 µm, in particular 10-3000 µm, preferably 50-1000 µm, particularly preferably 100-500 µm. If a solvent was contained in the primer, the layer thickness refers to the primer that has been dried of the solvent.

After the primer has been applied to one or both surfaces of the substrates to be welded, and optionally after the primer has dried, the substrates to be welded can be interconnected using a conventional welding method. Welding of plastics materials is usually carried out by means of local plasticization of the join partners in the joining plane, and joining under pressure. The process parameters should be selected such that pronounced squeezed flowing of the melt results in optimum connection of the join partners in the joining plane. Heating can be carried out by means of convection, contact heating, radiation or friction. The different energy input for plasticization can occur in a range of ways and has resulted in different processes for welding plastics materials. Suitable welding methods are, for example:

Hot gas welding [HG]
Convective heating using a hot gas stream, in general air, two-stage process Hot plate welding [HP]
Contact heating, two-stage process Ultrasonic welding [US]
Heating by means of friction, a transverse wave in the ultrasound range leads to heating in the boundary layer, single-stage process High frequency welding [HF]
Heating by internal friction, polar molecules align according to a high-frequency magnetic field, single-stage, only used for polar plastics materials and films Friction welding [FRW]: Linear; Orbital; Spin; Angle
Heating by means of friction, single-stage process Laser welding [LW]: contour, simultaneous, quasi-simultaneous, mask
Heating by means of radiation, coherent radiation, laser transmission welding, generally single-stage (two-stage is possible)

Infrared welding [IR] Heating by means of radiation, incoherent radiation, two-stage The welding methods set out above can optionally also be combined such as, for example, infrared welding and friction welding. The polyamide plastics is particularly preferably welded to the poly(meth)acrylate plastics using a welding method selected from hot plate welding, thermal contact or thermal pulse welding, warm gas or hot gas welding, microwave or induction welding. Laser butt or laser irradiation welding, infrared welding, ultrasonic welding and a combination thereof, in particular selected from infrared welding, ultrasonic welding, friction welding and combinations thereof.

A method for integrally joining the two plastics materials using the primer that contains the following steps is particularly preferred:

providing the first plastics material comprising a first joining zone, providing the second plastics material comprising a second joining zone, preheating the first joining zone, applying the primer to the preheated first joining zone, in particular in the case of solvent-free primers, bringing the first joining zone provided with the primer into contact with the second joining zone, integrally connecting the first joining zone to the second joining zone, in particular by using conventional plastics materials welding methods such as infrared welding, hot plate welding, hot gas welding, friction welding, ultrasonic welding.

In general, DIN 1910-3:1977-09 can be applied for welding plastics materials. Therefore, integral joining of thermoplastics using heat and/or pressure can be understood in this context. The heating can be carried out for example on the basis of contact heating (welding using solid bodies), convection heating (welding using hot gas), radiation heating (welding using a beam), and heating by means of friction (welding by means of movement), as well as welding by means of electrical power.

In an advantageous development, a primer is used that is selected and matched to the method such that application thereof to a heated and/or hot joining zone at a temperature that is lower than the decomposition temperature of the polymers in the primer does not have any influence on the internal chemical cross-linking of the primer.

It is advantageous to preheat the first joining zone of the first plastics material. Auxiliary agents and techniques that are known to a person skilled in the art and are suitable for the purpose can be used for preheating. In particular, using hot gas or plasma is suitable for preheating. Preheating by means of radiation, in particular infrared radiation or laser radiation, is also conceivable. A heating element or a heated tool can also be used for preheating the first joining zone. Finally, preheating in an oven or in a heated room is also conceivable. Preheating the entire plastics material and thus also said joining zone is conceivable. Alternatively or in addition, however, it is also possible to preheat merely the joining zone itself.

In an advantageous development, the spacing of the heating device from the plastics material, in particular from the first joining zone to be preheated, in particular the spacing of the heat-emitting region of the heating device or the heat-emitting region of the heating device or the effective surface to be preheated of the heating device or the region of the heating device opposite the first joining zone is in a range of from 0.5 mm to 100 mm, preferably in a range of from 1 mm to 60 mm during preheating. It is also conceivable, alternatively, for heating to be carried out by and/or while making contact between in particular the first joining zone and the heating element of the heating device.

Selecting the plastics material for the first join partner and adjusting the method parameters to the first plastics material such that the first joining zone melts when preheated and that a melt layer is produced in the first joining zone upon preheating is a further advantage. In a particularly preferred embodiment, the thickness of the melt layer is preferably in the range of from 0.05 mm to 6 mm, particularly preferably in the range of from 0.1 mm to 5 mm. A melt layer of this kind can result in better adhesion and/or diffusion and/or interaction of the molecules and, in conjunction with a specific flow, can also lead to an improved connection layer. If the boundary layer of the first plastics material is in the molten state interactions as far as chemical bonding with the primer may occur. The melt layer can in particular be dependent on the component geometry and the relevant component design. Preferably, the method parameters are adjusted and/or selected such that no deformation of the components results. Temperature differences between the joining zone and the primer to be applied are preferably equalized using suitable means and/or method steps. In this case, it is conceivable in particular to preheat the primer in order to reduce the temperature difference between the preferably thermoplastic primer and the first joining zone. This can for example counteract the rapid cooling of the first joining zone between the process steps.

Optionally, the first joining zone is pretreated, preferably before the step of preheating the first joining zone. Alternatively or in addition, the second joining zone can also be pretreated. For example cleaning using a solvent or a for example alkaline plastics cleaner is conceivable as a possible pretreatment. Mechanical pretreatment may also be used, in particular by means of scraping, polishing, brushing or radiation. Conceivable chemical pretreatments are in particular acid cleaning or using reactive gases. Moreover, the use of a thermal, chemical and/or physical pretreatment may prove expedient, in particular by means of gas flames or plasma arcs. Alternatively or in addition, electrical pretreatment by means of corona discharge can, during which the first joining zone and/or the second joining zone is subjected to electrical corona discharge in order that polar molecules result at the corresponding surface. A further option is plasma treatment, preferably using a plasma nozzle, for pretreating the joining zone, in particular in order to activate and/or clean the corresponding surface. Nonetheless, coating by means of plasma may also prove expedient. A further option is flaming the joining zone in order to increase the surface tension in suitable plastics materials. A further type of pretreatment is radiation using UV rays, electron beams, radioactive rays or by means of a laser. Finally, pretreatment may also be carried out in the form of a coating, in particular by painting or using an adhesion promoter. It is also conceivable to pretreat the first plastics material or the joining zones of the first plastics material a longer time before preheating. It is thus conceivable, for example, to already carry out the pretreatment during the process of manufacturing the first plastics material, in order to be able to further process the pretreated plastics material in the method according to the invention.

It is conceivable for the primer to be applied in various ways. For example, and in particular in the industrial field, application using an automated application aid, in particular by means of a metering robot, is conceivable. In this case, said robot can be equipped with a needle and/or a height sensor in order to be able to carry out complex metering processes. The primer may also be applied by means of injection molding, in that the primer is plasticized in an injection molding machine and injected under pressure into the mold containing the first plastics material comprising the first joining zone. A film application is alternatively conceivable, a film first being prepared from the primer in a first by means of film blowing or flat film extrusion. Subsequently, the film can be cut into any desired shape, for example by means of a cutting or stamping method, and, following the mentioned preheating, can be applied, in a further step, to the first joining zone. In this case, it has been found to be expedient to use films/plates having a thickness in the range of 1 μm-5000 μm. Further conceivable application possibilities are extrusion welding, during which the primer is present in the form of a welding wire or melted in an extruder and can be applied, in molten form, to the first joining zone. It is also possible for the primer to be provided in the form of a welding wire in order to make application by means of hot air welding possible. A further option is to apply the primer by means of a spraying method. Pretreatment and/or preheating and/or locally varied temperature control of the injection molding tool is also possible in the case of application during injection molding. Of course, other types of application that are known to a person skilled in the art and are suitable for the specific use are also conceivable.

Further heating or heating the first joining zone while the primer is being applied, in particular in order to prevent the temperature of the first joining zone from dropping between preheating and application of the primer is a further advantage. This can be carried out by means of the preheating method step described above which, for the sake of simplicity, can be continued during the application. Alternatively or in addition, additional heating, in particular by means of a further method step, is possible. It may thus prove to be expedient, for example, to simultaneously heat the first joining zone, for example by means of simultaneously exposing the first joining zone to radiation, forced convection, and contact heating during primer application, in order to prevent the temperature of the first joining zone from dropping following the preheating.

In an advantageous development, the primer is applied such that a connection layer having a thickness in the range of from 1 μm to 5 mm, preferably in the range of from 10 μm to 3 mm, is arranged on the first joining zone. In this case, the thickness of the connection layer is to be understood as the material thickness of the connection layer on the first joining zone.

A further advantage is applying the primer to the first joining zone by means of a metering device while the first joining zone and the metering device are moved relative to one another, the first joining zone, to which the primer is applied, being preheated, prior to application of the primer, by means of a heating device while the first joining zone and the heating device are moved relative to one another, the primer being applied by means of the metering device when the first joining zone is in the preheated state.

In this case, it has been found to be particularly advantageous for the heating device to be moved past the first joining zone at a speed in the range of from 10 mm/min to 100 mm/min, preferably in the range of from 10 mm/min to 30 mm/min, during preheating.

It may further be advantageous for the heating device to precede the metering device, preferably at a defined and constant spacing. In particular, it is advantageous to carry out the method in such a way that the primer is applied to the first joining zone by means of a metering device while the metering device and the first joining zone are moved relative to one another in a range of from 10 mm/min to 100 mm/min, preferably in the range of from 10 mm/min to 30 mm/min, said joining zone to which the primer is applied being preheated, prior to application of the primer, by means of a heating device while the heating device and the first joining zone are moved relative to one another, the heating device preferably simultaneously preceding the metering device or a nozzle of the metering device for applying the primer at a time lag in the range of from 0.1-10 s.

In this case, it has been found to be particularly advantageous to use a coating unit consisting of the metering device and the heating device. In this case, a coating unit can in particular be understood to be a unit that provides a rigid connection between the heating device and the metering device, such that the heating device precedes the metering device preferably at a defined and constant spacing during the relative movement in order to ensure that the first joining zone is preheated immediately before the primer is applied. Of course, it is also conceivable, in this case, for the spacing to be adjustable or, in the case of convective preheating, for the volume flow and/or nozzle diameter of the medium to be adjusted in particular by means of suitable mechanically, electromechanically or pneumatically operated adjusters.

In contrast, the coating unit can also be understood to be a heating device and a metering device in the form of two entirely isolated or separate modules which, however, perform the same or substantially the same relative movement with respect to the plastics material in order to ensure that the location of application of the primer is preheated immediately before the primer is applied.

In an advantageous development, although the heating device and the metering device perform substantially the same primary relative movement having substantially the same basic direction with respect to the plastics material, at least one of the two mentioned devices experiences an additional relative movement, in addition to said primary relative movement, with respect to the plastics material. Thus, for example, the heating device and/or the metering device can perform one or more secondary relative movements in addition to the primary relative movement during which, for example, the primer may also be applied. For example, in particular the heating device and/or the metering device can perform or experience a secondary relative movement that circles or meanders around the primary relative movement.

In this case, the plastics material on the one hand, or the heating device and the metering device or both devices together as the coating unit on the other hand, can be moved. In this case, it is possible for the heating device and the metering device or both devices together as the coating unit on the one hand, and the plastics material on the other hand, to be stationary or for the moving part thereof to be moved in a different direction in each case.

In an advantageous development, a primary relative movement takes place at a speed in a range of from 10 mm/min to 100 m/min, preferably in a range of from 10 mm/min to 30 m/min, such that for example, in particular also due to a suitable design of the heating device, the residence times of the plastics material within the heating surfaces of the heating device are as short as possible, in particular in a range of from 1 to 60 s. This can be understood to be a region or space around the heating device that influences the temperature in the sense of increasing the temperature, i.e. preheating, of the first joining zone of the first plastics material. It is thus possible to avoid too much heating and damage to the plastics material or degradation of the plastics material for example.

It may in addition prove to be advantageous, in particular in order to connect the metering device and/or the heating device to/into existing production lines, to equip the heating device with a bus interface, in particular for a PROFIBUS, or with a real-time ethernet interface.

After said primer has been applied, the second joining zone is brought into contact with the primer layer. In this case, it may prove to be expedient to fix the two plastics materials together, in particular by means of clamping devices or similar fixing auxiliary agents that are known to a person skilled in the art.

Of course, the second joining zone may optionally be pretreated prior to the step of bringing the second joining zone into contact with the primer layer. In this case, in particular all the above-described pretreatment techniques are conceivable. It is also conceivable for the second plastics material or the joining zones of the second plastics material to be pretreated to be pretreated a longer time before being brought into contact. It is thus conceivable, for example, to already carry out the pretreatment during the process of manufacturing the second plastics material, in order to be able to further process a pretreated plastics material in the method according to the invention. The pretreatment of the second plastics material may also include applying the primer to the second joining zone. In this case, it is preferably also conceivable to preheat the second joining zone prior to applying the primer. The above embodiments are also preferred here.

Bringing the second joining zone and the primer into contact, as described above, is followed by a joining process in which the treated and/or coated join partners are plasticized by means of a supply of heat and are integrally interconnected, preferably under the action of pressure. It is conceivable to use a heat supply by means of thermal conduction, for example by means of hot plate welding and/or thermal contact welding and/or thermal pulse welding; by means of friction, in particular ultrasonic, friction or high-frequency welding; microwave or induction welding; by means of convention, such as warm gas or hot gas welding; by means of radiation, for example infrared, laser butt or laser irradiation welding, or by means of a combination of two or more of said techniques, for this integral connection between the second joining zone and the primer.

This invention further relates to objects or products produced according to the method according to the invention.

Furthermore, this invention relates to the use of a primer according to the invention for welding a polyamide plastics and a poly(meth)acrylate plastics.

EMBODIMENTS

Materials used and abbreviations:
PA=polyamide
PA 6=polycaprolactam, Durethan BKV30
PA 6.6=poly-(N,N'-hexamethylene adipamide); Ultramid A3K
PMMA=poly(methylmethacrylate)
PMMA 1=Polycasa G87E
PMMA 2=Plexiglas 8N
MAH=maleic anhydride
Peroxide=Luperox A75 (75 wt. % benzoyl peroxide, 25 wt. % water)
THF=Tetrahydorfuran
MIBK=methyl isobutyl ketone
CH=cyclohexanone
Copolymer SM1=styrene-maleic anhydride copolymer having 15 wt. % MAH and Mw 170000 g/mol
Copolymer SM2=styrene-maleic anhydride copolymer having 8 wt. % MAH and Mw 250000 g/mol
Copolymer SM3=styrene-maleic anhydride copolymer having 26 wt. % MAH and Mw 180000 g/mol
Copolymer SM4=styrene-maleic anhydride copolymer; Mw 180000 g/mol and partially esterified with isobutyl/methyl IR: infrared welding; IR-FR: infrared/friction welding; US: ultrasonic welding Preparation of the Styrene-Maleic Anhydride-Methyl Methacrylate Copolymers SMA 5 and 6

| Copolymer | Mixing ratio styrene/methyl methacrylate/maleic anhydride [mol/mol/mol] | Styrene in g | Methyl methacrylate in g | Maleic anhydride in g | Peroxide in wt. % |
|---|---|---|---|---|---|
| SMA 5 | 1/1/1 | 6.25 | 6.01 | 5.93 | 0.1 |
| SMA 6 | 1/1/0.2 | 8.33 | 7.98 | 1.54 | 0.1 |

Copolymers were synthesized from styrene, methyl methacrylate and maleic anhydride, according to the above table, by means of bulk radical polymerization. All the starting materials and the initiator were weighed into a 1 liter 2-neck flask and heated very slowly in an oil bath and while being stirred vigorously by a magnetic stirrer, to an oil bath temperature of 95° C. After a solid compound had formed, said compound was heated to 140° C. for 4 hours. The reaction product was dissolved in 100 ml THF and, after being cooled to 20° C., was precipitated in 300 ml methanol. After filtration using a Buchner funnel, the resulting copolymers were freed of residual solvent under vacuum. Colorless solids were obtained.

Preparation of Primers 1-10:

In order to prepare the primers, the polymer components were dissolved in solvent, by mechanical stirring, and degassed at 25° C. The composition of the primers in g can be found in the following table.

|  | Primer | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| SM1 |  | 50 | 105.27 | 105.27 |  |  |  |  |  |  |
| SM2 |  |  |  |  | 105.27 |  |  |  |  |  |
| SM3 |  |  |  |  |  | 105.27 |  |  |  |  |
| SM4 |  |  |  |  |  |  | 17.5 | 17.5 |  |  |
| SMA5 |  |  |  |  |  |  |  |  | 10 |  |
| SMA6 |  |  |  |  |  |  |  |  |  | 10 |
| PMMA 1 | 50 |  | 90.04 |  |  |  |  |  |  |  |
| PMMA 2 |  |  |  | 90.04 | 90.04 | 90.04 | 15 | 15 |  |  |
| THF |  |  |  |  |  |  | 67.5 |  | 40 | 40 |
| MIBK | 93.36 | 93.36 | 364.69 | 364.69 | 364.69 | 364.69 |  |  |  |  |
| CH | 35.84 | 35.84 | 140 | 140 | 140 | 140 |  | 67.5 |  |  |

Preparation of Primers 11 to 13:

Copolymers were synthesized from styrene, methyl methacrylate and maleic anhydride, according to the above table, by means of emulsion polymerization in water. The respective ratios of the monomers to one another can be found in the following table.

| Primer | Mixing ratio styrene/methyl methacrylate/maleic anhydride [mol/mol/mol] | Styrene in g | Methyl methacrylate in g | Maleic anhydride in g |
| --- | --- | --- | --- | --- |
| 11 | 1/2/1 | 24.5 | 47.0 | 23.0 |
| 12 | 1/1/0.2 | 42.9 | 42.9 | 8.6 |
| 13 | 1/1/0.1 | 14.6 | 14.0 | 1.4 |

Primers 11 and 12 were prepared in such a way as to result in an emulsion having a water content of 52 wt. % and 0.5 wt. % of the surfactant Disponil SDS G. For primer 13, the water was removed and the resulting copolymer was dissolved in 75 wt. % THF.

It was possible to prepare dispersions of the copolymers and/or primers that, at room temperature, did not exhibit any sedimentation for several weeks.

General Test Execution:

The primers were applied, at room temperature, to the surface (130 mm×3 mm) of the lower half of the PA plastics material to be welded (deviations therefrom are marked accordingly in the following table). Subsequently, the primer was dried of solvent for 24 hours at room temperature. After drying, the thickness of the primer was approximately 0.2 mm. The pre-dried plastics components having a geometry of 130 mm×68 mm×3 mm were subsequently welded end-to-end to the 130 mm×3 mm surface. The tensile strength was determined at room temperature and at a traction speed of 5 mm/s. The following tables in each case show the tensile strength (in MPa) that was able to be achieved for the welded test specimens, for the combination of the primer with the plastics materials and welding method used:

IR and IR-FR Welding:

| | Polymer combination (welding method) | | | |
|---|---|---|---|---|
| Primer | PA6 + PMMA1 (IR) | PA6 + PMMA1 (IR-FR) | PA6 + PMMA2 (IR) | PA6 + PMMA2 (IR-FR) |
| No primer | 0 | 0 | 0 | 0 |
| 1 (comparison) | 0 | 1.87 | 0 | 1.58 |
| 2 | | 6.01 | | 5.77 |
| 3 | 10.56 | 10.67 | 10.94 | 12.01 |
| 7 | | Application on PMMA; 13.57 | | |
| 9 | | | | 6.33 |
| 10 | | 12.43 | | 11.73 |
| 12 | | | | Application on both parts to be joined; 5.69 |
| 13 | | | | Application on both parts to be joined; 15.51 |

Ultrasonic Welding:

| Primer | Polymer combination (welding method) |
|---|---|
| | PA6 + PMMA2 (US) |
| No primer | 1.15 |
| 4 | 8.4 |
| 5 | 9.5 |
| 6 | 9.7 |
| 7 | Application on PA; 6.11 |
| 8 | PA12 + PMMA2 7.59 |
| 10 | 5.34 |
| 11 | 6.46 |
| 12 | 4.06 |
| 13 | 8.44 |

The results show that the samples welded using a primer exhibit excellent tensile strength. It can also be seen that the primers comprising a mixture of cyclohexanone and methyl isobutyl ketone as the solvent do not have any bubbles after the solvent has evaporated. However, the time required for the solvent to evaporate increases with cyclohexanone.

Ageing Test of Welded Samples:

For the ageing test, the PA plastics substrate was coated with primer 7, as carried out above. Subsequently, the plastics materials PA 6.6 and PMMA 2 were connected by means of manual hot plate welding at a temperature of approximately 280° C. and a heating time of 15 seconds for the PMMA and 45 seconds for the PA 6.6. For the ageing test, the samples were then stored at a temperature for a specified time and subsequently, following further storage at room temperature for 24 hours, the tensile strength test was carried out at room temperature. The results are as follows:

| | Storage condition | | | | |
|---|---|---|---|---|---|
| | 24 hours 20° C. | 24 hours 50° C. | 24 hours 70° C. | 8 days 50° C. | 8 days 50° C. and 80% atmospheric humidity |
| Tensile strength in MPa | 17.08 | 13.47 | 11.33 | 12.92 | 12.41 |

The results show excellent ageing stability of the welded samples.

What is claimed is:

1. A method for welding polyamide plastics and poly(meth)acrylate plastics, comprising:
    providing a polyamide plastic substrate having a surface defining a joining zone on a portion of that surface,
    providing a poly(meth)acrylate plastic substrate having a surface defining a joining zone on a portion of that surface,
    applying a primer onto the joining zone surface of at least one of the polyamide plastic substrate and the poly(meth)acrylate plastic substrate,
    positioning the polyamide plastic substrate joining zone adjacent the poly(meth)acrylate substrate joining zone so that the primer is disposed between the joining zones, and
    welding the polyamide plastic substrate joining zone to the poly(meth)acrylate substrate joining zone,
    wherein the primer contains at least one copolymer synthesized from at least one styrene or styrene derivative and at least one maleic anhydride or maleic anhydride derivative.

2. The welding method according to claim 1, wherein the polyamide plastic is selected from the group consisting of polyamide 6, polyamide 6.6, polyamide 6.10, polyamide 6.12, polyamide 10.10, polyamide 11, polyamide 12, polyamide 10.12, polyphthalamides, optically transparent polyamides and mixtures based on said polyamides.

3. The welding method according to claim 1, wherein the poly(meth)acrylate plastic is made up of 50 to 100 wt. % methyl methacrylate, the poly(meth)acrylate plastic has molar mass (weight average Mw) of more than 50000 g/mol, and/or the poly(meth)acrylate plastic is a poly(methylmethacrylate) plastic.

4. The welding method according to claim 1, wherein the at least one copolymer has a molar ratio of styrene to maleic anhydride of from 1:0.01 to 1:2.

5. The welding method according to claim 1, wherein the at least one copolymer comprises a monomer selected from the group consisting of acrylates and methacrylates.

6. The welding method according to claim 1, wherein the at least one copolymer has a maleic anhydride content of 0.1-50 wt. %, based on the copolymer.

7. The welding method according to claim 1, wherein the at least one copolymer of the primer has a glass transition temperature Tg of more than 30° C.

8. The welding method according to claim 1, wherein the at least one copolymer has a weight-average molecular weight Mw in the range of from 5000-2000000 g/mol.

9. The welding method according to claim 1, wherein the primer contains, in addition to the at least one copolymer, at least one further polymer that is compatible with at least one of the polyamide plastic or the poly(meth)acrylate plastic to be welded.

10. The welding method according to claim 1, wherein the primer contains 10-90 wt. % of organic solvent, based on the total weight of the primer.

11. The welding method according to claim 10, wherein the organic solvent has a vapor pressure at 20° C. of from 1 to 600 hPa, and the organic solvent is selected from the group consisting of tetrahydrofuran, methyl isobutyl ketone (MIBK), cyclohexanone and mixtures thereof.

12. An object produced according to the welding method according to claim 1.

13. The welding method according to claim 1, wherein the step of welding comprises hot gas welding, hot plate welding, ultrasonic welding, high frequency welding, friction welding, laser welding, infrared welding, thermal contact welding, thermal pulse welding, microwave welding, induction welding or a combination thereof.

14. The welding method according to claim 1, wherein the step of welding comprises ultrasonic welding, friction welding, infrared welding or a combination thereof.

15. The welding method according to claim 1, wherein the welded polyamide plastic substrate joining zone and the poly(meth)acrylate substrate joining zone form a weld seam.

16. The welding method according to claim 1, wherein the polyamide plastic substrate is welded to the poly(meth)acrylate substrate only in their respective joining zones.

17. The welding method according to claim 1, wherein the step of welding comprises heating the polyamide plastic substrate and the poly(meth)acrylate plastic substrate only in their respective joining zones.

18. The welding method according to claim 1, wherein the primer is an aqueous dispersion or emulsion.

* * * * *